US011945982B2

(12) United States Patent
Wilken et al.

(10) Patent No.: US 11,945,982 B2
(45) Date of Patent: Apr. 2, 2024

(54) METHOD FOR THE ADHESIVE BONDING OF ELECTRICAL SHEETS AND ELECTRICAL SHEET PACKS PRODUCED ACCORDING TO A CORRESPONDING METHOD (71) Applicant: Fraunhofer-Gesellschaft zur Förderung der angewandten Forschung e.V., Munich (DE)

(72) Inventors: Ralph Wilken, Rastede (DE); Matthias Popp, Bremen (DE); Jost Degenhardt, Bremen (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 1004 days.

(21) Appl. No.: 16/759,639

(22) PCT Filed: Nov. 2, 2018

(86) PCT No.: PCT/EP2018/080059
§ 371 (c)(1),
(2) Date: Apr. 27, 2020

(87) PCT Pub. No.: WO2019/086634
PCT Pub. Date: May 9, 2019

(65) Prior Publication Data
US 2023/0312984 A1    Oct. 5, 2023

(30) Foreign Application Priority Data
Nov. 3, 2017   (DE) .......................... 102017125714.4
May 7, 2018    (DE) .......................... 102018110951.2

(51) Int. Cl.
*B32B 7/12*   (2006.01)
*B32B 37/02*  (2006.01)
(Continued)

(52) U.S. Cl.
CPC  *C09J 7/29* (2018.01); *B32B 7/12* (2013.01); *B32B 37/02* (2013.01);
(Continued)

(58) Field of Classification Search
CPC ....... C09J 7/29; C09J 7/385; C09J 5/02; C09J 2400/163; C09J 2400/166; C09J 2433/00;
(Continued)

(56) References Cited

U.S. PATENT DOCUMENTS 4,442,138 A    4/1984  Bich et al.
6,080,258 A    6/2000  Tittgemeyer
(Continued)

FOREIGN PATENT DOCUMENTS

DE         19720549 A1    11/1998
DE       102012001744 A1    8/2013
(Continued)

OTHER PUBLICATIONS

DELO Industrie Klebstoffe: Gebrauchsanweisung & Allgemeine Hinweise zur Produktgruppe DELO-ML, Anaerobe Klebstoffe. 2011. S. 1-4. URL: https://www.distrelec.chAA/eb/Downloads/_m/an/delo-ml_ger_man.pdf [abgerufen am Oct. 8, 2018].—Firmenschrift. German with Google English translation.
(Continued)

*Primary Examiner* — James D Sells
(74) *Attorney, Agent, or Firm* — PRETI FLAHERTY BELIVEAU & PACHIOS LLP (57) ABSTRACT The invention relates to a method for producing an electrical sheet pack using an anaerobically curing adhesive, to an electrical sheet pack produced or producible by such a method, and to a device for creating an electrical sheet pack of the invention.

23 Claims, 3 Drawing Sheets

(51) Int. Cl.

| | | |
|---|---|---|
| *B32B 37/12* | (2006.01) | |
| *B32B 37/24* | (2006.01) | |
| *B32B 38/00* | (2006.01) | |
| *B32B 38/04* | (2006.01) | |
| *C09J 5/02* | (2006.01) | |
| *C09J 7/29* | (2018.01) | |
| *C09J 7/38* | (2018.01) | |
| *C21D 8/12* | (2006.01) | |
| *H01F 1/18* | (2006.01) | |

(52) U.S. Cl.
CPC .......... *B32B 37/1284* (2013.01); *B32B 37/24* (2013.01); *B32B 38/0012* (2013.01); *B32B 38/04* (2013.01); *C09J 5/02* (2013.01); *C09J 7/385* (2018.01); *C21D 8/1283* (2013.01); *H01F 1/18* (2013.01); *B32B 2037/1253* (2013.01); *B32B 2037/243* (2013.01); *B32B 2307/206* (2013.01); *B32B 2307/536* (2013.01); *B32B 2310/14* (2013.01); *B32B 2457/00* (2013.01); *C09J 2400/163* (2013.01); *C09J 2400/166* (2013.01); *C09J 2433/00* (2013.01)

(58) Field of Classification Search
CPC ....... B32B 7/12; B32B 37/02; B32B 37/1284; B32B 37/24; B32B 38/0012; B32B 38/04; B32B 2037/1253; B32B 2037/243; B32B 2307/206; B32B 2307/536; B32B 2310/14; B32B 2457/00; C21D 8/1283
USPC ........................................................ 156/182
See application file for complete search history.

(56) References Cited

U.S. PATENT DOCUMENTS

| | | | |
|---|---|---|---|
| 11,535,021 B2 * | 12/2022 | Böker | ........................ C09J 5/06 |
| 2019/0240965 A1 | 8/2019 | Böker | |

FOREIGN PATENT DOCUMENTS

| | | |
|---|---|---|
| DE | 102012005795 A1 | 9/2013 |
| DE | 102015016338 A1 | 6/2017 |
| JP | 02300278 A | 12/1990 |
| JP | 10204383 A | 8/1998 |
| JP | 1998-323969 A | 12/1998 |
| JP | 2006-334648 B2 | 12/2006 |
| JP | 2007-006581 A | 1/2007 |
| WO | 2004/021664 A1 | 3/2004 |
| WO | 2017/097404 A1 | 6/2017 |

OTHER PUBLICATIONS

Gebrauchsanweisung Anonymous. "Bebrauchsanweisung & Allgemeine Hinweise zur Produktgruppe DELO-ML Anaerobe Klebstoffe" Mar. 1, 2017 (Mar. 1, 2017), pp. 1-4, Retrieved from the Internet: https://cloudfront.delo.de/documents/de/instructions/DELO_ML GEBR-D_.pdf [retrieved on Feb. 4, 2019] XP055551459. German with Google English translation.

Examination Report for priority application DE102018110951.2, dated Oct. 8, 2018.

International Search Report for related application PCT/EP2018/080059, dated Feb. 21, 2019. German with English translation.

Mishra et al. "Design, fabrication and characterization of thin power inductors with multilayered ferromagnetic-polymer composite structures," Microelectronic Engineering 160 (avaialbe online Mar. 3, 2016) 34-38.

* cited by examiner

METHOD FOR THE ADHESIVE BONDING OF ELECTRICAL SHEETS AND ELECTRICAL SHEET PACKS PRODUCED ACCORDING TO A CORRESPONDING METHOD

The invention relates to a method for producing an electrical sheet pack using an anaerobically curing adhesive, to an electrical sheet pack produced or producible by such a method, and to a device for creating an electrical sheet pack of the invention.

To create high-efficiency electrical machines it is necessary to realize sheet packs composed of individual laminations, with low sheet thicknesses, in order to maximize the efficiency with which eddy current losses in the packs are suppressed. The individual laminations of the pack in this case are insulated from one another electrically, preferably by at least one insulation layer. A commonplace pack-forming method is that of punch stacking, with which mechanical bracing between the individual laminations connects the laminations to form a pack. The deformation of the sheets, however, has an adverse effect on the magnetic properties of the sheet and therefore of the sheet pack.

Besides punch stacking, pack-forming by means of laser weld seam is known practice, but likewise adversely affects the magnetic properties and likewise is accompanied to an increased extent by eddy current losses.

In order to obtain sheet packs with good strengths and good magnetic properties, a sheet stacking method is known wherein an electrical sheet is coated over the full area with a thin layer of adhesive. The adhesive is cured either by heating the sheet pack, after punching, in a downstream curing step, or by briefly heating the individual laminations before stacking and after preliminary punching and before final punching, with transfer of the lamination into the pack brake, using IR radiation, for example. A disadvantage here is the high energy demand for curing, and the resultant high cycle times.

Furthermore, there are adhesive stacking methods wherein the adhesive, after preliminary punching and before final punching, is applied dotwise and the adhesive is cured in the pack brake. The resultant adhesive bonding is not present over the full area, and features comparatively low bond strengths.

The literature reference "Gebrauchsanweisung Allgemeine Hinweise zur Produktgruppe DELO-ML" [Use Instructions General Information on the DELO-ML Product Group], www.delo.de, DELO_ML_GEBR_(2).pdf" describes how even the surface pretreatment of surfaces without catalytic activity can be undertaken using a brass or copper brush. There is, however, no motivation to carry out this operation on layers, insulation layers for example, whose mechanical damage may be critical.

Against this background, an object of the invention was to provide a new production method for electrical sheet packs that permits reliable joining of individual electrical sheets to form a sheet pack, where the magnetic properties of the electrical sheet ought to be as little adversely affected as possible and/or eddy current losses ought to be efficiently suppressed, and/or at the same time good strength of the sheet pack can be ensured.

It ought preferably to be possible to incorporate this method into the punching operation, or for the method to be in direct temporal relationship to the punching operation. Furthermore, the method ought preferably to take place at high speed and/or to result in few or no detractions from the electrical insulating effect between the laminations.

This object is achieved by a method for producing an electrical sheet pack, comprising the steps of:
a) providing electrical sheet strip (19) as starting material for the sheet laminations for the electrical sheet pack (11),
b) coating the electrical sheet strip (19) with an insulation layer on one or both sides,
c) coating the electrical sheet strip (19) on one side with an anaerobically curing adhesive,
d) rubbing the other side of the electrical sheet strip (19) with a rubbing device (3) which comprises beryllium-containing and/or transition metal-containing surface structures, preferably copper-containing surface structures,
e) separating the individual laminations for the electrical sheet pack (11) from the electrical sheet strip (19),
f) contacting the laminations for the electrical sheet pack (11) in each case by contacting one side of one lamination with the other side of the next lamination, and
g) curing the adhesive.

An electrical sheet in the sense of the present invention is a sheet which is able to acquire soft-magnetic properties through a suitable annealing operation, and is able preferably to meet the requirements of DIN EN 10106:2016-03 or DIN EN 10107:2014-07.

An electrical sheet in the sense of the present invention is preferably an engineering material which possesses soft-magnetic properties and is suitable, for example, as an engineering material for magnetic cores. Electrical sheet preferably comprises cold-rolled material made of an iron-silicon alloy, for which laminations manufactured therefrom can be used to produce magnetic circuits for electrical machines, more particularly iron cores of dynamos, generators, electric motors, transformers, relays, contactors, choke coils, ignition coils, current meters, and controllable deviation magnets. An electrical sheet strip in the present context is a windable material made of electrical sheet, whose width is low in relation to its length.

With particular preference in the sense of the present invention an electrical sheet is a cold-rolled, non-grain-oriented electrical sheet in the semiprocessed state according to DIN EN 10106:2016-03, or a grain-oriented electrical sheet in the semiprocessed state according to DIN EN 10107:2014-07.

In the sense of the present text, individual laminations together form the electrical sheet pack, with the individual laminations being electrically insulated from one another. Step f) in the sense of the method of the invention does not mean that the laminations themselves must come into direct contact with one another; here, instead, it is sufficient if the originally separate laminations come into indirect contact with one another, especially if the mutually facing sides of the laminations to be contacted are coated (or else only one of them), it is sufficient for the contacting to take place by way of the coating(s).

An anaerobically curing adhesive in the sense of the present invention is an adhesive which cures under anaerobic conditions. Preferred anaerobically curing adhesives are those based on a dimethacrylate and/or those selected from the group consisting of 3M Scotch-Weld GM 74, Locite 620, LOCTITE 518, LOCTITE 577, Delo ML 5327, Delo ML 5249, Delo ML UB 160, Permabond HM 135, Permabond A 131, Permabond A 1046, Permabond A130, Cyberbond RL 65 and Cyberbond RL 67, It is likewise possible to use adhesives which as well as the anaerobic curing mechanism also have a second curing mechanism, such as photocuring or UV curing, for example. This group includes, for example, the adhesives Delo ML DB 133, Delo ML 135, Delo ML 136 and Delo ML 180. Further information on anaerobically curing adhesives is also found in DE 102013017107 A1, especially in paragraph [0008]. In principle the anaerobically curing adhesives to be used in the invention are reliant for curing on a metallic catalyst. This metallic catalyst is a transition metal or beryllium, preferably selected from the group consisting of beryllium, iron, manganese, cobalt and copper, and with particular preference copper 99%, more preferably copper 99.0% soft-annealed, more preferably copper 99.9% soft-annealed. In the sense of the present invention, references to the stated metals also include compounds thereof and alloys thereof as well.

Rubbing in the sense of the present invention is a contacting of two surfaces, with at least one of the two surfaces, preferably both surfaces, being moved laterally to the contact face. This rubbing may be a very short process, if it occurs, for example, as part of a jetting process wherein particles are jetted at relatively high velocity onto a surface. It will be appreciated that for the rubbing process there must always be a pressing pressure. With rubbing in the sense of the present invention, it is always two solid bodies which are contacted under the stated conditions. The rubbing is accomplished preferably in the form of brushing.

Correspondingly, the preferred device for the rubbing is a brush, a sponge or a pad having beryllium-containing and/or transition metal-containing surface structures. Where the rubbing device is a jetting device, the corresponding metal-containing surface structures in the sense of the present text are located in the jetting medium. It will be appreciated that in the sense of the present invention, the metal-containing surface structures in each case are brought into contact with the electrical sheet strip. Preferred surface structures for the rubbing in the sense of the present invention are beryllium-containing and/or transition metal-containing filaments or bristles of a rubbing device in the form of a sponge, a pad or, more preferably, a brush. It is particularly preferred here for the surface structures for use in the invention to comprise or consist of copper.

Separating in the sense of the present invention is preferably a complete removal of a single part (a single lamination) from the electrical sheet strip. The separation is accomplished preferably in the form of cutting, especially laser cutting or jet cutting, e.g., water-jet cutting, or, more preferably, in the form of punching, e.g., in the form of rotary punching.

It will be appreciated here that the steps of the method of the invention need not take place in the recited order, the skilled person being able instead to vary the method step sequence appropriately. For example, the skilled person will perform step c) after step d) in the case where the anaerobic adhesive is to be applied to the side of the electrical sheet strip that is rubbed in step d).

With the method of the invention it has emerged, surprisingly, that by virtue of the rubbing, especially in the form of brushing, in step d) on the electrical sheet surface, on the one hand sufficient copper to catalyze the curing process was transferred to the electrical sheet surface, and on the other hand the insulation properties of the insulation layer, where present, were not restricted in terms of insulation properties. In the invention it is preferred for the rubbing, especially the brushing, to take place on a side of the electrical sheet strip that has been provided with an insulating layer.

Preferred in the method of the invention is an anaerobically curing adhesive which cures under anaerobic conditions and in the presence of a catalyst. Typically for this purpose a liquid activator (a solution containing metal ions) is applied, for application of the catalytic transition metal, preferably copper, which is needed for the curing.

The insulation layer for use in the invention comprises no copper and preferably neither beryllium, manganese nor cobalt, and very preferably no transition metal that would act as an activator for the process of curing the anaerobically curing adhesive. On the surface of the insulating layer, moreover, the concentration of iron is preferably 1 at % iron (measured by XPS). With particular preference there is no iron on the surface of the insulating layer.

Further advantages of the method of the invention, including in particular in its embodiments as described above and also those mentioned later on below, are considered to be that on the one hand it is possible for electrical sheets to be reliably bonded, and on the other hand the fabrication environment, especially the device which is used separating (especially for punching) the laminations from the electrical sheet strip, is preserved from the curing of any entrained adhesive fouling or even blocking the device.

This is ensured by virtue of the fact that the separating, especially punching, process takes place under aerobic conditions and preferably, additionally, the device for separating the laminations and the stacking device have significantly reduced, more preferably no, catalytic activity on the running faces, cutting edges and cutting faces and surfaces, and that curing requires both the presence of anaerobic conditions and also of the catalyst, which in this present invention must be a transition metal or beryllium or a corresponding alloy, with particular suitability here being possessed by copper. With particular preference this separating device comprising the separating (punching) tool and the brake is fabricated from highly alloyed tool steels which possess low catalytic effect on the anaerobic adhesive.

In the method of the invention, in step d), the side (other side) of the electrical sheet strip, the side not to be coated with adhesive, is preferably brushed with a device (especially a brush) comprising transition metal-containing or beryllium-containing surface structures (especially bristles), more particularly with a brush comprising bristles containing brass, copper, bronze (especially phosphor bronze or gunmetal), iron, steel, manganese or beryllium, and in this case—surprisingly—there is sufficient transfer of the catalyst material so that the curing of the anaerobically curing adhesive under other conditions not only is ensured but in fact occurs without delay. At the same time, preferably, by (optionally only partial) abrasion of the uppermost layer of the electrical sheet, the electrical sheet is freed from any adhesion-reducing substances present, the surface is slightly roughened, and so the bondability of the electrical sheet surface is improved.

A preferred rubbing device for use in the invention, especially a brush, comprises a carrier of transition metal-containing and/or beryllium surface structures, especially filaments, more particularly filaments containing copper or iron, and, in a preferred method, the rubbing device for preferred use in the invention comprises other filaments as well, such as animal hairs, bristles or feathers, polymeric fibers and filaments, basalt and glass fibers and filaments, or microfibers, which contain neither beryllium, iron and copper nor other transition metals.

Using such rubbing devices, especially brushes, it is possible for there to be not only the transfer of the catalyst needed for the curing process but also further functions, such as, for example, the cleaning of the electrical sheet strip to remove adhering contaminants. In the method of the invention, in step e), the individual laminations are separated from the electrical sheet by a punching process, more preferably by a punching process with a progressive punching tool.

This separation process may be accomplished, in a further preferred embodiment, by laser cutting, jet cutting, preferably water-jet cutting, or rotary punching, on the basis of two opposite rolls with cutting edges lying on them.

The contouring of the individual lamination may also, in a further embodiment, take place only after the adhesive stacking process. Techniques suitable for subtractive shaping include milling methods, wire or spark erosion, laser cutting, jet cutting, and—for particularly precise contouring—preferably grinding and polishing methods. In this case it is particularly advantageous to carry out grinding and polishing orthogonally to the sheet normal, in order to impose as little mechanical load as possible on the bonded sheet pack and to prevent the formation of conductivity paths at the cut edges.

Preferred in accordance with the invention is a method wherein step g) takes place at least partially in a stacking device which ensures the orientation of the individual sheet laminations with respect to one another. This stacking device may consist of movable side parts which on addition of a lamination move apart easily (preferably hydraulically) in order to allow the lamination to be inserted. A ram presses the newly added sheet lamination onto the stack. At the same time and/or subsequently, the side parts move together and adjust the position of the new sheet lamination in relation to the layer stack. The surfaces of the stacking device that come into contact with the sheet laminations have significantly reduced, more preferably no, catalytic activity in relation to the curing of the adhesive. Where the engineering material of which this stacking device is made has such catalytic activity, the surfaces which come into contact with the sheet laminations are preferably not coated with catalytically active material. The stacking device may be part of the punching device (in which case it is also often referred to as a "brake"), or else it may also be separate from the punching device, in which case the laminations have to be transferred to the stacking device after having been stamped out.

In the case of a preferred punching device, preferably having a plurality of punching stations (progressive integrated tool), step g) takes place at least partially in the brake into which the laminations are transferred after the punching-out device. The ram in this case frequently performs the pressing of the new lamination with the layer stack.

A punching-out device in the sense of this text is a (partial) device for severing the electrical sheet, and comprises preferably a female mold and a ram (male mold). The punching-out device which effects the separation of the lamination from the electrical sheet is also referred to as the stamping-out station.

The brake of the punching device is that part of the punching device in which the separated laminations fall (or are pressed) after the punching process and are stacked accordingly to form the (future) electrical sheet pack. For the method of the invention, this brake is configured so that when two laminations are stacked one on the other the conditions prevailing between these laminations are anaerobic. The brake in this case is preferably a stacking device in the above-described sense.

It is likewise preferred in the invention if step g) (the contacting of the laminations) takes place likewise in the brake. This ensures that the two prerequisites needed for the curing process of the adhesive (catalyst and anaerobic conditions) are present only in the brake.

Fundamentally it should be noted that the catalytically active metals as a constituent of the corresponding rubbing devices, especially bristles, may for example be alloys, oxides, hydroxides, carbonates or carboxylates of the transition metals and/or of beryllium, with preferred metals in this context being beryllium, iron, manganese, cobalt and copper, very particular preference being given to copper. Where the catalytically active brush filaments are metallic filaments of beryllium, it will frequently be the case that the material from the brushes is transferred in the form of oxide-covered particles with a metallic core onto the surface of the sheet insulation layer.

Preferred in the invention is a method wherein the beryllium-containing and/or transition metal-containing surface structures, especially bristles, possess a diameter of ≤1 mm and ≥5 μm, preferably ≤500 μm and ≥10 μm, more preferably ≤250 μm and ≥20 μm and very preferably ≤125 and ≥30 μm, and/or have a Vickers hardness of 25-200, preferably 40-100 for the beryllium-containing and/or transition metal-containing surface structures, especially bristles (Vickers hardness 100 g testing force) and/or have a nominal tensile strength of ≤600 MPa and ≥10 MPa, preferably ≤500 MPa and ≥50 MPa, more preferably ≤400 MPa and ≥200 MPa. The nominal tensile strength here is a limiting criterion whose selection is particularly preferred.

The reason for this is that without the finding of the present invention, the skilled person would have been inclined to select filaments (especially bristles) with high elasticity modulus and high hardness and also high tensile strength, in order to counteract premature wear and in order to be able to transfer forces reliably to the component without plastic deformation of the filament material. Thus commercial brass or bronze brushes possess numerous hard brass filaments, typically of CuZn36, CuZn37 or CuSn6, which typically possess over nominal tensile strengths of more than 600 MPa.

It has surprisingly emerged that with such tensile strengths it is not possible to fulfill all preferred, desired aspects of the present invention in a high degree.

The aspect ratio of bristles used, being the length of the bristles relative to diameter, is preferably ≤1000 and ≥10, more preferably ≤500 and ≥50, very preferably ≤250 and ≥100. With these aspect ratios, a particularly good elastic behavior can be observed for the bristles, without plastic deformation on small differences in height or on vibrations of the steel strip. These aspect ratios, moreover, ensure that the bristles are able to exert an advantageous normal force on the steel strip.

The skilled person deliberately sets the angle, made up of bristle orientation and movement vector of the electrical strip, in order to adjust both the abrasiveness and the wear of the bristles. An angle 90° is particularly disadvantageous, since in this case the bristles very quickly become plastically deformed (the bristles bend away). Too small an angle is disadvantageous because the contact point of the bristle with the electrical sheet cannot lie exclusively at the end of the bristle and so there may be significantly more rapid wear of the bristles. The skilled person therefore preferably selects angles between 2 and 80°, more preferably between 10 and 70°, very preferably between 25 and 60°, most preferably 45°.

When designing the separating tool, the skilled person preferably provides for the rubbing, especially brushing, process to be performed without great oscillations and or movements taking place in the direction of the surface normal of the strip. For this purpose the skilled person preferably provides strip-calming stations which minimize these movements. Such calming measures are also advantageous during application of the adhesive.

To prevent the entrainment of Cu-containing particles in the process sequence, the skilled person preferably provides cleaning stations which remove excess particles or particles not adhering on the electrical sheet. This removal is more preferably carried out immediately after the rubbing process. For this purpose it is possible to use nonwovens, or alternatively cleaning brushes, e.g., sword brushes. At the same time, any minimal abrasion of the insulation layer that has formed in the rubbing process is removed. This ensures that the thicknesses of adhesive layer are not limited by the particle size of the abrasion of the insulation layer. This is particularly important when adhesive layer thicknesses ≤5 µm are to be realized. With this configuration of the catalyst-containing rubbing device, especially in the preferred variants, it has been found that the transfer of the catalyst (beryllium and/or iron, copper or other transition metals) for the curing of the anaerobically curing adhesive takes place particularly reliably, while the insulation effect of the insulation layer is also retained particularly reliably. Generally speaking, in the selection of the suitable rubbing agents, especially bristles, for the brushes that are to be used, the hardness are to be selected such that it is not significantly harder than the insulation coating. For this purpose the skilled person will use bristles adapted to the insulation coating that is used.

At the same time or additionally, the skilled person will choose the filament diameter of the catalyst-containing rubbing agents, especially bristles, such as on the one hand to ensure sufficient abrasion but on the other hand also so that the striations produced in the insulation layer by the bristles are not too large and in particular are not too deep.

Without being tied to a theory, it is expected that the brushing produces a tribological stressing of the insulation coating of the electrical sheet. In this case there may be formation of a transfer film or tribological film which encompasses the constituents of the rubbing agents and also constituents of the insulation layer and remains on the insulation layer.

In the method of the invention it is preferable for the brush with the beryllium-containing and/or transition metal-containing bristles to be selected from the group consisting of disk brush, plate brush, strip brush, sword brush, cup brush, cone brush, roller brush, round brushes and spiral brush.

These forms of brushes have proven particularly suitable for the method of the invention, further preference being given to the brush used executing a rotating movement on the electrical sheet strip (especially with an insulation layer).

The skilled person additionally ensures that not only the rubbing proceeds in regions of the device for implementing the method of the invention, in which the electrical strip has been calmed, but also excessive vibrations of the electrical strip as a result of the separating process are avoided. For this purpose, the skilled person takes suitable precautions by strip calming.

In case of doubt, the rubbing device itself may calm the electrical strip.

In order to reduce the likelihood of any entrained quantities of adhesive curing at unwanted locations, in the punching tool, for example, the entrainment of catalyst particles from the rubbing process should likewise be prevented. Preferably there is a suction withdrawal facility mounted on the rubbing device. The position of the suction withdrawal facility is selected so that the resultant particles are drawn off, preferably in the direction of the velocity vector of the relative movement between bristle tips and electrical sheet.

With further preference the entrainment of particles can be prevented by wiping down the rubbed (especially brushed) surfaces with a sponge or cloth and so removing loosely adhering particles. These cloths are either of circulating design, with a cleaning station outside the punch, or must be replaced at regular intervals. It is advantageous for the cloth or the sponge to have been moistened with a liquid medium.

The entrainment of the catalyst particles may likewise be prevented by a sword brush. In this case the brush is fitted with soft filaments and so removes loosely adhering particles. This sword brush as well is preferably equipped with a cleaning station.

As already described above, it is preferred for the rubbing (especially brushing) to be carried out on the insulation layer, with this layer more preferably, of course, having already undergone full curing.

Analogously, the surface may be pretreated by sponges or cloths which include transition metal-containing or beryllium-containing filaments, preferably copper-containing filaments.

Analogously, the surfaces may be pretreated by jetting methods wherein the jetting agent contains copper—e.g., a mixture of copper powder and granulated plastic with low abrasiveness. In this case it should be ensured that the jet angle is adjusted so as to produce very largely flat particles on the surface of the electrical sheet. High jet pressures with low jet angles (jet angle=90°−(angle of the velocity vector to the specimen normal)) are an advantage here.

Analogously, the surfaces may be treated by a jetting method wherein the jet of jetting agent first strikes a copper-containing target, where it generates copper-containing particles, and this jetting agent, with the copper-containing particles thus generated, finally strikes the surface of the electrical sheet to be pretreated. Here as well, high jet pressures at low jet angles (jet angle=90°−(angle of the velocity vector to the specimen normal)) are an advantage.

In principle—and not in accordance with the invention—the surface may be subjected to a dispersion—in the form of an aerosol, for example—containing copper particles, by spraying a dispersion of copper particles in a dispersion medium, e.g., water, ethanol, or polymer component of an anaerobically curing adhesive, for example. A disadvantage in this case is that the copper particles ought to be significantly smaller at least in one dimension than the layer thickness, which in preferred embodiments <1 µm. Producing these particles is costly and inconvenient, the use of solvents is a disadvantage for the environment, and, if water is used as the dispersion medium, it is not suitable for rapid processes owing to the need for drying.

Likewise in principle—and not in accordance with the invention—it is also possible for transition metal-containing or beryllium-containing particles to be deposited from the gas phase in a flame method. A disadvantage here is that the oxidic nanoparticles preferentially formed are given off into the gas phase and lead to environmental burdens.

Preferred in accordance with the invention is a method wherein the adhesive in step c) is applied over the area or part of the area preferably in a spraying or printing method. Full-area application for the adhesive, in the sense of the present text, here means that the entire area of the (optionally later lamination, i.e., lamination yet to be punched out) on one side of this lamination ("the one side" of the lamination) is coated with the adhesive.

Application of the adhesive over part of the area in the sense of this text means here that only a part of the (future) lamination is coated with the adhesive. In that case it may be preferable in accordance with the invention for a region of 500 μm, preferably 200 μm, more preferably 100 μm of the margin of the later individual laminations not to be coated with adhesive. Moreover or additionally it may be preferable, in the case of corners of the (future) lamination with angles of <180°, to reduce the adhesive-free margin toward the corner, and/or, in the case of corners of the (future) lamination with angles >180°, to deliberately increase the size of the adhesive-free margin toward the corner.

Another reason why this application over part of the area is preferred is because it avoids the direct contact of the adhesive with the cutting edges of the female mold and the male mold and hence the unwanted entrainment of the adhesive.

All of these preferred measures of adhesive application (each individual one and, in particular, altogether) serve to reduce the likelihood of adhesive emerging when the laminations are contacted and so leading to instances of fouling, especially in the brake, or serve to ensure reliable bonding of the two laminations to be contacted.

Adhesive application preferably takes place ahead of the stamping-out station. In order to prevent unwanted blocking of the punching tool, preference is given to cyclical cleaning of the female mold and the male mold, and takes place after adhesive application. This cleaning prevents the unwanted and uncontrolled entrainment of the adhesive. This cleaning may take place, for example, by various cleaning methods: $CO_2$ snow jetting, spray cleaning (solvent or water-based cleaning medium, cutting oil), laser methods, wiping with optionally impregnated cloth or sponge.

Preference is given here to a method of the invention wherein the adhesive in step c) is applied in a layer thickness of 0.3 μm-50 μm, preferably of 0.5 μm-20 μm, and more preferably of 0.5 μm-6 μm.

Here as well, the thickness of application of the adhesive serves in particular on the one hand to ensure effective bonding and on the other hand to minimize potential fouling of the fabrication environment by the adhesive. A minimal layer thickness of adhesive is also preferred in order to maximize the stacking factor, i.e., the proportion of the soft-magnetic material in the electrical sheet pack.

Application of the adhesive over part of the area may be advantageous in order to minimize adhesive-layer thicknesses.

Advantage is possessed by lines which are broadened during pressing and so enable lower layer thicknesses.

An advantageous alternative are dots in a hexagonal arrangement (two-dimensional Bravais lattice) which are broadened during pressing and so enable lower layer thicknesses, possibly merging into one another. The applied layer thickness of these lines and dots may be greater by a factor of 50 than the adhesive layer thickness to be achieved after pressing.

Particularly preferred are dots in a hexagonal arrangement. The dots here may be pressed toward all sides. Removal of air during pressing may be ensured until the individual dots make contact.

To get to particularly low layer thicknesses, it is advantageous to displace the two adherends laterally to one another before, during or after the pressing. This promotes the spreading of the adhesive. Movement, in the form of vibration, for example, after the contacting and before the compressing is particularly advantageous.

When selecting the anaerobically curing adhesive, the skilled person will preferably ensure that this adhesive has a sufficiently low viscosity, to allow extremely low layer thicknesses to be produced. Likewise preferably the skilled person will ensure that the viscosity in turn is not too low, since otherwise there might be uncontrolled spreading and escape from the desired locations. Furthermore, the skilled person will preferably ensure that the (cured) adhesive has a sufficiently high cohesive strength. Another preferred selection criterion for the adhesive to be used is a sufficient aging stability of the resultant adhesive with respect to medial and thermal loads. Possible guideline variables in this context are, for example, the stability under conditions of 150° C. in hot transmission oil and/or aging at 85° C. and 85% relative humidity. In principle the skilled person will ensure that the adhesive withstands the thermal loads to be expected during the processes of punching and of curing.

In many cases it will be preferable in the inventive method for the region to which the adhesive is applied and/or the region which is rubbed (brushed) to be limited in each case with a mask.

For the rubbing (brushing) this means that deliberately the only areas that can be rubbed (brushed) are those on which later, after the contacting, curing of the adhesive is desired. This applies particularly to those regions of the electrical sheet strip which later form the laminations.

The situation regarding adhesive application is similar. Here as well, masks can be used to ensure that the adhesive is applied at exactly those points where it is wanted. By means of masks in this case it is also possible to control the amount of adhesive at certain points.

It is preferred in the invention, accordingly, for the adhesive to be applied in combination with masks in a spraying process.

In the case of a method wherein the adhesive is applied by printing processes (which may likewise be preferable in certain cases in the invention), there will generally be no need for masks. Suitable printing processes in this context are, for example, transmission printing (e.g., screen printing, especially roller screen printing), gravure printing (e.g., pad printing), and letterpress (e.g., flexographic printing), and also inkjet processes.

It may be preferable in accordance with the invention if in the method of the invention before step c) the one side (that is, the side to which the adhesive is applied) and/or before and/or after step d) the other side (that is, the side which is rubbed) undergoes an adhesion-improving and/or surface-activating pretreatment step, especially by means of a plasma, e.g., atmospheric pressure plasma, or flaming, or irradiation with light (vacuum UV/laser). By this means it is possible to improve further the adhesion conditions between the individual laminations. This measure likewise improves the wetting behavior of the adhesive on the electrical sheets. Accordingly, on joining of the lamination to the sheet stack, the capillarity of the gap is increased and hence the spreading of the adhesive in the gap is promoted. As a result of this measure, relatively small, minimal adhesive-layer thicknesses are accessible.

The printing process is preferably synchronized with the advance of the electrical strip. In the case of roller screen printing, the circumference of the roller corresponds preferably to the rate of advance or is a multiple of the rate of advance. With roller screen printing, the adhesive is transferred from the screen to the electrical sheet during the advance of the electrical strip. Particular preference is given to the driving of the roller screen printing roll by the marginal perforation of the electrical sheet, which ensures the transport of the electrical strip.

With flatbed screen printing, the adhesive is preferably transferred from the screen to the electrical sheet during separation, in other words in the rest phase of the electrical strip, without advance.

The skilled person also ensures that the application of adhesive takes place in regions of the punch wherein the electrical strip has been calmed, and that excessive vibrations of the electrical strip as a result of the punching process are avoided. For this purpose, the skilled person takes suitable precautions for strip calming.

In case of doubt, the screen roller or the flatbed screen may itself calm the electrical strip.

Preferred in accordance with the invention is a method of the invention wherein the respective first and last laminations of the electrical sheet pack (11) are not subjected to step c) on their outwardly directed side.

In this way it is simple to separate the electrical sheet packs from one another in the production process.

In this context it is preferred, moreover, for the first and last laminations of the electrical sheet pack as well, on their outwardly directed side, not to be subjected to step d). Alternatively it is also possible for only step d) not to be carried out, albeit with the consequence that there is still adhesive present on one side of each sheet pack, but separation is possible nonetheless.

Preference is given to a method of the invention wherein the curing of the adhesive is assisted by supply of energy, preferably in the brake (9) or in other regions of the punching device.

In principle this energy supply may take place during the curing process or else even before the curing process. Before the curing process it means that the adhesive already has an elevated temperature when the curing process begins, and accordingly the curing process as well is thus accelerated.

It is preferred in accordance with the invention in this context for the supply of energy to take place via thermal radiation, more preferably by way of an IR thermal emitter or of a direct heat transfer (thermal conduction).

Particularly preferred is a method of the invention wherein after step d) on the brushed area there is a concentration of transition metal or beryllium, preferably of copper, of 1 atom %, especially 0.015 atom % to 1 atom %, preferably 0.1 atom %, measured by means of ESCA and based on the total number of atoms detected by ESCA. It is preferable here to take account only of copper and manganese for the purpose of determining the concentration of the transition metals.

These small amounts of transition material and/or beryllium are sufficient, surprisingly, to ensure the curing reaction of the adhesive for use in the invention, at a sufficiently high speed. It is self-evident here that for the stated atom % figures, the reference in each case is the sum total of transition metal and beryllium. It is preferable here for the only transition metal to be copper, and for no beryllium to be present.

A surprising fact is that such a low amount of catalyst metals is also sufficient as a heterogeneous catalyst, since according to common conceptions it is necessary for the catalyst metal in ionized form to have to penetrate into the (uncured) adhesive layer with a sufficient depth of penetration, as homogeneous catalyst, in order to ensure a sufficient speed of the curing reaction.

In case of doubt, these atom % concentrations are determined on the surface which has been brushed, in the manner as described below in measuring example 2b.

Also part of the invention is an electrical sheet pack, produced or producible by a method of the invention, wherein between the insulating layer and the adhesive or in the adhesive there are beryllium-containing and/or transition metal-containing particles, preferably beryllium-containing and/or transition metal-containing metallic particles.

Surprisingly, even after the curing of the adhesive, beryllium-containing and/or transition metal-containing particles can still be detected in the majority of cases. In that case the metallic particles of the catalyst metal are preferably in a size of 1-10 μm, where the size of the individual particles is defined in each case by the largest diameter in a perpendicular view onto the surface of the lamination.

The thickness of the particles, being the greatest extent of the particles perpendicular to the surface of the lamination, is much smaller, conversely. The particle thicknesses are preferably between 100 nm and 3 μm. The aspect ratio, being the ratio of particle size to particle thickness, is preferably between 2 and 50. The particles may therefore be said to be platelet-shaped particles.

Preference is given to an electrical sheet pack of the invention which, furthermore, has striations on at least one side of the laminations (optionally with the exception of the outermost laminations), with the striations originating from the rubbing, especially brushing, process from the method of the invention. Such striations regularly represent a locally limited reduction in the insulation layer thickness by at least 10%. The distances between two striations from the method of the invention are around 100 μm in the case of a brush filament diameter of 250 μm. The striation width in this case is about 10-30 μm. For the determination of striations, reference is made to measuring example 1.

Also part of the invention is a device for creating an electrical sheet pack of the invention, comprising a rubbing device, especially a brush (3), a device (13) for applying an anaerobically curing adhesive, and a reservoir containing an anaerobically curing adhesive.

It may be pointed out here that the device of the invention may further comprise each individual component/constituent as evident from FIGS. 1-4.

DESCRIPTION OF FIGURES

FIGS. 1-4 each represent schematically a device and a process for providing a sheet pack according to the invention. The reference symbols in these figures have the following meanings:
1. Punch
3. Disk brush
5. IR emitter
7. Stamping-out station
9. Brake
11. Sheet pack
13. Spraying device
15. Spraying chamber
17. Mask
19. Electrical sheet strip
21. Roller brush
23. Strip brush With reference to FIG. 1, an embodiment of the method of the invention is described first of all:

Figure 1:
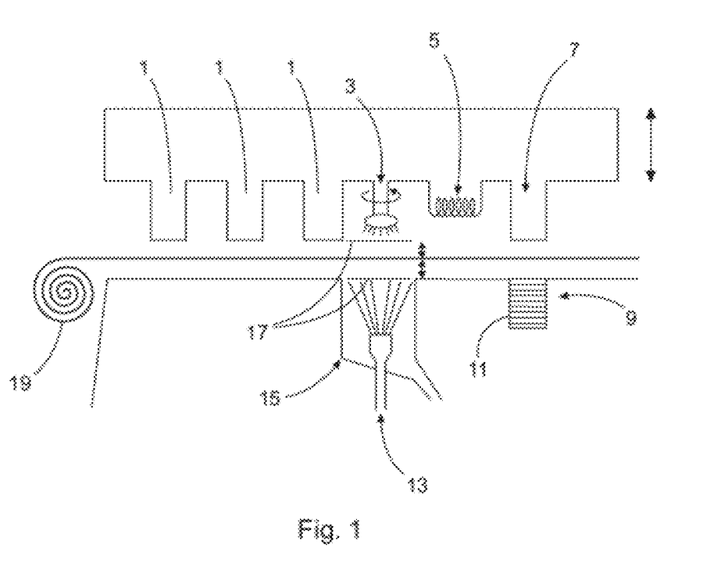

By means of an advancement unit, the electrical strip 19 provided with insulation coating is advanced by a defined length with each stroke of the punching process. Immediately before the stamping-out of the electrical sheet lamination from the electrical strip and transfer of the lamination into the brake 9, the electrical strip 19 is coated from the underside with the adhesive by means of spraying device 13 in the spraying chamber 15. In order for the adhesive to be applied in a locally defined way, a mask 17 is used. The overspray collects on the walls of the spraying chamber 15 and accordingly is collected on the base of the spraying chamber. Simultaneously or, in the case of a prior progressive punching step, by one of the punches 1, the upper side of the electrical strip 19 is brushed with a rotating brush plate 3 having copper filaments (bristle diameter, for example, 0.06 mm). In this case a mask 17 of thin titanium sheet is used, in which the areas to be bonded have been laser-cut.

Advantageous in the process is that the masks 17 are brought into contact with the electrical sheet only before the application of the adhesive and/or before brushing. This is enabled by guiding the masks 17 onto the electrical sheet strip 19 in synchronicity with the stroke of the punching tools 1 (downward movement). On upward movement of the punching tools 1, both masks are removed synchronously from the electrical strip 19, and so during the advance of the electrical strip 19 there is no smearing of the adhesive and likewise neither brush 3 nor mask 17 cause scuffing on the electrical strip 19.

Synchronously with the stroke of the punch, 1. the application of the adhesive is triggered, 2. the rotating brush 3 is brought into contact. In order to take account of the wear of the brush, the contact of the brush 3 with the electrical strip is preferably not travel-controlled, but instead force-controlled, so that the filaments are deformed elastically by the pressing pressure of the brush on the electrical strip.

In the stamping-out station 7, the electrical sheet lamination is punched out of the electrical strip 19 with a ram (male mold) through the female mold and is transferred directly into a punching brake 9. The ram here presses the freshly punched-out lamination onto the sheet pack 11 which is located in the brake, and so moves the sheet pack 11 further downward by the thickness of the sheet lamination. In this case the adhesive of the freshly punched-out lamination comes into contact with the brushed surface of the lamination already present in the brake 6. This initiates the curing of the anaerobically curing adhesive. Pack separation, being the separation of two sheet packs 11, is ensured either by the adhesive not being applied in one stroke or by the surface of one lamination not being brushed. Ideally there is neither brushing of the leading lamination nor application of adhesive to the following lamination.

The curing of the anaerobically curing adhesive may be accelerated by supply of heat, not only by the stamping-out ram or in the brake but also by IR emitters 5 in the progressive punching tool. In general the operating temperature of the punching tool is higher than the ambient temperature, and this already accelerates the curing of the adhesive.

Instead of a disk brush, suitability is likewise possessed by strip brushes 23, cup brushes, sword brushes or roller brushes 21. Instead of the spray application, suitability is likewise possessed by printing processes (pad printing, screen printing, flexographic printing). In addition, nonwovens and sponges with transition metal-containing and/or beryllium-containing filaments present on their surface are suitable.

Figure 2:
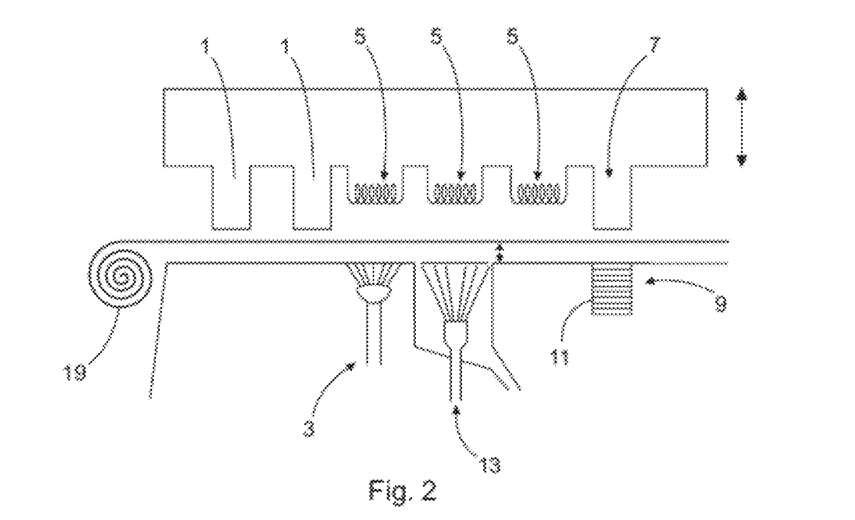
Figure 3:
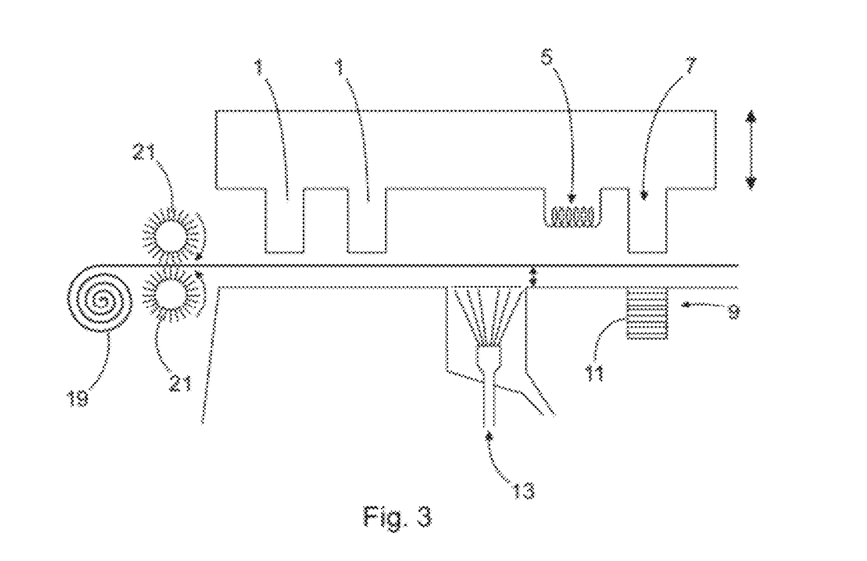
Figure 4:
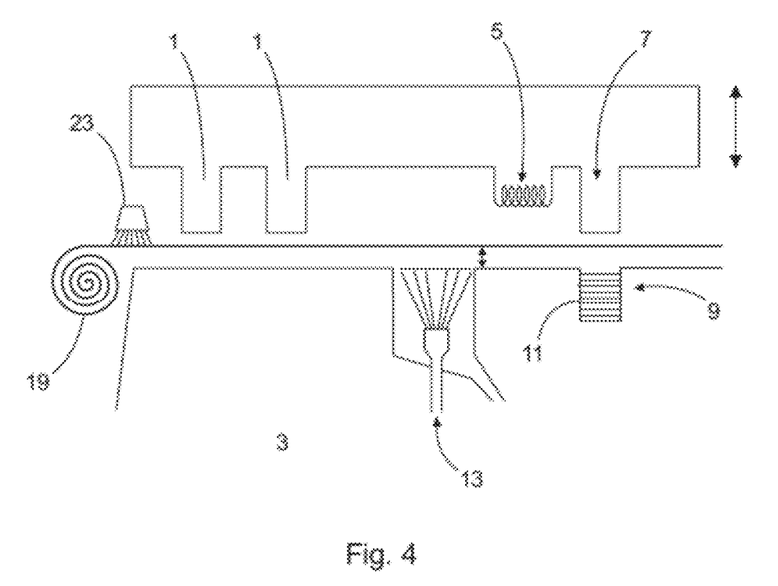

In a further embodiment, a preceding step is the pretreatment of the electrical strip 19, which may take place both from the bottom side and from the top side (cf. FIG. 2).

Additionally, it is also possible for only one side to be activated, and then for the adhesive to be applied to the activated surface. The reaction starts only after exclusion of oxygen, namely when this sheet side is contacted with a further sheet (cf. FIGS. 3 and 4).

EXAMPLES

Measuring Example 1: Determination of Striations 2 polished sections of at least 2 laminations of an electrical sheet pack are prepared in such a way that
   the surface normal of the at least one adhesive layer lies orthogonally to the surface normal of the section (that is, lies in the surface of the section), and
   the surface normal of the two section surfaces are in turn orthogonal to one another.

These sections are analyzed materialographically. If it is difficult to distinguish the individual layers (electrical sheet/ insulation layer/adhesive layer) under the optical microscope, the skilled person employs scanning electron microscopy.

The striations resulting from brushing are manifested in a locally confined reduction in the insulation layer thickness of at least 10%. For both sections, the skilled person then measures the length containing 50 striations. Length 1 and length 2 are generally not the same (only on 45° orientation). The greater of the lengths is called a, the lesser length b.

The mean spacing d of the striations is then obtained as follows:

$$d = \cos(\arctan(a/b)) \times a/50$$

Typical spacings between two striations are around 100 μm for a brush filament diameter of 250 μm. The striation width is around 10 to 30 μm.

Measuring Example 2a: Determination of Beryllium Content or Transition Metal Content, Especially Cu Content, by ESCA (XPS)

ESCA analyses were carried out in order to determine the copper content after brushing. The content reported in each case is that based on the total number of atoms determinable by ESCA.

The ESCA analyses were carried out using the KRATOS AXIS Ultra spectrometer from Kratos Analytical. The analysis chamber was equipped with an X-ray source for monochromatic Al Kα radiation and with an electron source as neutralizer. Moreover, the unit possessed a magnetic lens, which focused the photoelectrons via an entry slit into a hemispherical analyzer.

Through calibration, the aliphatic component of the C 1s peak was set at 284.5 eV. During the measurement, the surface normal pointed to the entry slit of the hemispherical analyzer.

In the determination of the amount-of-substance ratios, the pass energy in each case was 80 eV and the step width 0.5 eV. The corresponding spectra are termed overview spectra. In the determination of the peak parameters, the pass energy was in each case 20 eV and the step width 0.05 eV.

Measuring Example 2b: Determination of the Beryllium Content or Transition Metal Content, Especially Cu Content, by ESCA (XPS) with Improved Detection Limit for Copper The XPS analyses took place using a Thermo K-Alpha K1102 system with upstream argon glovebox for the handling of samples sensitive to air. Parameters: Take-off angle of the photoelectrons at 0°, monochromatic Al Kα excitation, Constant Analyzer Energy mode (CAE) with 150 eV pass energy in overview spectra (step width 0.5 eV, 2 scans with a recording duration of 9 min 4.2 sec) and also in the energetically high-resolution Cu2p (step width 0.05 eV, 10 scans with a recording duration of 12 min 21 sec). The high-resolution Cu2p spectrum is employed in order to quantify the copper.

Area under analysis: 0.40 mm ø. Electrically nonconducting samples are neutralized through a combination of low-energy electrons and low-energy argon ions. To compensate for charging effects, the C1s principal photoemission line to be assigned to the C—C/C—H species in the analysis is fixed at 285 eV, with a corresponding consequent shift in the positions of the other photo lines.

Quantification takes place on the basis of documented relative sensitivity factors of the elements, taking account of the specific analyzer transmission function, based on the assumption of a homogeneous distribution of the elements within the XPS information depth (around 10 nm).

The detection limit of the method is element-specific and lies at around 0.1 at %. On the basis of the measuring conditions and of the sensitivity factor of copper, the detection limit of copper in the measurements is 0.005 at %.

The stated measuring conditions are preferred in order to make the results largely independent of the type of spectrometer.

Measuring Example 3: Determination of Beryllium Particles or Transition Metal Particles, Especially Copper Particles Samples which have not yet been bonded can be analyzed directly after the rubbing procedure.

Laminations of sheet laminates that have already been bonded are parted from one another by means of peeling stress. It is in each case the outermost lamination that is parted from the sheet pack. In order to apply the peeling stress, the skilled person employs a wedge, which is driven into the adhesive layer. After the sheet lamination has been parted, both fracture faces are analyzed by microscope. In general there is a mixed fracture pattern with adhesive components. The particles are preferably located with embedment in the adhesive layer, and are therefore "floating in the adhesive". Measuring examples 4-6 are suitable for the actual, closer determination.

Measuring Example 4: FIB Section and EDX Measurement

These particles can likewise be measured by SEM/EDX, following surface preparation at the location of one particle by means of fast ion bombardment (FIB).

For the preparation of the cross section using the FEI Helios 600 Dualbeam, following location of the particles, ion beam-induced deposition (IBID) was first used to deposit an approximately 30×2×1 μm platinum/carbon protective layer directly over the particle. Then a cross section was prepared by means of Ga+ ions (30 kV, 21 nA) and this cross section surface was finally polished (30 kV, 2.8 nA). The cross section thus produced was imaged in situ in the FEI Helios 600 DualBeam using secondary electrons. The secondary electron images were recorded at 5 kV and 0.17 nA. In addition, the cross section surface was investigated for its elemental composition by means of energy-dispersive X-ray analysis (EDX). The parameters selected for this investigation (10 kV, 1.4 nA or 0.69 nA) enable all of the elements occurring to be detected with the maximum possible lateral resolution.

In rare cases, especially with (high layer thicknesses not preferred), it may be appropriate to part the adhesive layer from the substrate entirely. For that purpose, a scalpel is used to part the residues of adhesive remaining on the fracture face from the sheet, and these residues of adhesive are analyzed by microscope, in this case preferably using EDX element mapping. The skilled person selects the acceleration voltage such that the information depth of the measurement is the thickness of the layer of adhesive.

Measuring Example 5: Optical Microcopy

The instrument used is a Keyence VHX 600 digital microscope with VH-Z 100 lens and OP-72404 ring light source, magnification 700×.

The particles are evident in the plan view, with Cu particles in particular being readily apparent in this way.

If the contrast between particle and sheet substrate is too low, measurement takes place with SEM and EDX element mapping.

Measuring Example 6: SEM-EDX

A primary electron beam is generated using an electrode cathode and acceleration toward the anode, and, using subsequent electromagnetic lenses, is focused with maximum precision onto the surface of the sample under analysis. In the sample, in an interaction volume which is dependent on the acceleration voltage and on the composition of the material, secondary electrons (SE), backscattered electrons (BSE) and X-radiation are generated. The energy of the X-radiation is dependent on the atomic number of the emitting atom and is therefore "characteristic" of the element in question. All of these signals can be recorded using corresponding detectors. Corresponding topographic, material and/or elemental contrasts can be imaged in this way.

EDX is a method for the spatially resolved elemental analysis of solids. Energy-dispersive X-ray microanalysis makes it possible to ascertain the elemental composition on a surface imaged by SEM. In addition to surface and spot measurement, element mappings can also be recorded.

The acceleration voltage is selected by the skilled person so as to reliably capture the particles as a function of the thickness of the layer of adhesive, and is typically 15 keV.

Instrument used: High-resolution analytical Leo 1530 Gemini FE-SEM with EDX (Oxford INCA with Si and germanium detector).

Measuring Example 7: Determination of the Insulation Effect

Either the surface resistance is carried out using a Franklin tester according to IEC 60404-11, or, preferably, the following procedure is adopted (measuring protocol IFAM):

An electrical sheet of 100 mm×25 mm is brushed on one side. This sample is clamped between two copper rams with a diameter of 19.8 mm and a length of 30 mm and is subjected to a force of 650N, producing a pressing pressure of 2.1 MPa. The ram surfaces which come into contact with the electrical sheet have optically bright polishing.

The two Cu rams are connected by two cables to a Keithley Multimeter 2001 resistance meter. The resulting resistance is measured by means of two-point measurement. This measurement is repeated on 10 samples and the arithmetic mean is formed. Subtracted from this resistance is the resistance which comes about without the steel sheet (lead resistance and ram resistance).

Measuring Example 8: Determination of the Roughnesses

The roughnesses of the sample surfaces are detected using the plμ Neox instrument from Sensofar, by recording linear profiles orthogonally to the brushing direction. The linear profiles thus detected are analyzed according to DIN EN ISO 4288. Evaluations are made of the characteristic roughness values $R_a$ and $R_z$.

WORKING EXAMPLES

Working Example 1

An Isovac 270-35 A electrical sheet with a C5-grade insulation varnish (insulation varnish contains no transition metals and no beryllium) (manufacturer: VoestAlpine) in the size of a lap shear sheet (100 mm×25 mm) is brushed using a brass brush (bristle diameter 0.06 μm, material CuZn36, condition soft) in the region of the adhesive area (10 mm).

A further electrical sheet is coated, using a doctor blade, with the anaerobically curing adhesive DELO ML 5327, with a nominal layer thickness of 4 μm.

The brushed side of the first sheet is contacted with the adhesive-coated side of the second sheet and the assembly is fixed with a clamp (anaerobic conditions). After 2 minutes, the strength of the bond is sufficient to allow the bonds to move (handling strength). After 6 minutes at 40° C. (typical temperature of the punching tool in operation), the bond already exhibits lap shear values of 2.5+−0.7 MPa. After 24 h at room temperature, lap shear strengths of 4.5+−0.8 MPa are attained.

After 150 h of aging in transmission oil (FEBI Bilstein 39071) at 150° C., the lap shear strength was still 4.2+−0.5 MPa. After 1000 h of aging at 85° C. and 85 rel % humidity, the lap shear strength was 4.1+−0.2 MPa.

Working Example 2

The insulation quality of the electrical sheet stated in example 1 is determined by means of DIN EN 60404-11: 2013-12; VDE 0354-11:2013-12.

Title: Magnetic materials—Part 11: Method of test for the determination of surface insulation resistance of magnetic sheet and strip (IEC 60404-11:1991+A1:1998+A2:2012); EN 60404-11:2013

In deviation from example 1:
a) no brush,
b) a brush with 125 μm bristles (same bristle material as in working example 1), and
c) a brush with 250 μm bristles (same bristle material as in working example 1) are used.

Within the bounds of measurement accuracy (−+10%), no reduction in the surface resistance of the electrical sheet as a result of the brushing is observable:
a) rhoSURF=178+−13 ohm/cm2
b) rhoSURF=169+−15 ohm/cm2 (after brushing with 125 μm)
c) rhoSURF=171+−8 ohm/cm2 (after brushing with 250 μm)

Comparative Test (Prior Art)

For comparative testing, the activator DELO Quick 5004 was applied using a 4 μm doctor blade to the sheets of example 1. No brushing was performed. The subsequent steps were as follows:

application of the activator DELO Quick 5004 with 4 μm doctor blade
10 min evaporation of the activator
application of DELO ML 5327 with 4 μm doctor blade to activated surface
curing in analogy to working example 1.

It emerged that the strengths of the bonds and also the rate of the curing were no different from the results of working example 1, within measurement accuracies.

Working Example 3

Determination of the copper content in the samples from working example 2

For the samples from working example 2, the copper content was determined in accordance with measuring example 2a. The result was that no copper could be found for the non-brushed variant, whereas for the brushed variant there was indeed a portion of copper, but it was close to the detection limit (measured according to measuring example 2a, 0.1 atom %). Accordingly, the degree of surface coverage with copper is around 0.1% or around 0.2% on the assumption that copper oxide is present.

It is also noted that in no case was the electrical sheet strip exposed, since iron was not detectable.

Working Example 4

The samples from working example 1 and from working example 2 and also from the comparative example were then analyzed for copper particles in accordance with measuring example 3.

Here it emerged that in all three of the brushed examples (from working example 1 and also the brushed examples from working example 2), copper particles were detectable even under the optical microscope. The particles have sizes (maximum distance between the edges in plan view) of between 1 μm to 15 μm. The degree of surface coverage by measurement and counting of the particles on 10 microscope images according to measuring example 3 gave degrees of surface coverage of between 0.02 and 0.1%. Conversely, in the two other examples (not brushed or copper application in accordance with the prior art), there were no particles present.

From this it can be inferred that the copper particles (which are still detectable even after curing) give a distinct indication of the method of the invention.

Working Example 5

An electrical sheet M310-50A with a C5 insulation varnish EB5308 (manufacturer: Arcelor Mittal) in the size of a lap shear sheet (100 mm×25 mm) is brushed using various brushes (different bristles) in the region of the adhesive area (10 mm).

The brushes have a treatment width of 30 mm and consist of a series of brushes closely packed to one another; for example, for a brush diameter of 125 μm, there are 240 bristles adjacent to one another and in parallel alignment in a row. The length of the bristles varies.

The angle between bristle direction and movement vector of the electrical sheet is 45°. The bristle ends form a straight line. This line is parallel to the steel surface and oriented orthogonally to the movement vector of the electrical sheet. The pressing pressure is set by positioning the bristle mount of the brush, after contact of the bristle ends with the steel sheet, by a further 3 mm in the direction of the steel surface. In this case there is elastic deformation of the bristles.

The electrical sheet is then guided through under the brush with a velocity of 10 m/min. The number of brushing operations is varied.

The resulting surface resistances are measured, the elemental composition of the surface is determined by XPS in accordance with measuring example 2b, and the roughness is determined (see above).

to determine whether the strength of the bond is sufficient to enable movement of the bonds (handling strength).

| Sample | Handling strength (crosslinking after 5 min) | Strengths after 24 h [MPa] | Cu concentration at surface (metallic) [at %] | Fe concentration at surface (oxidic) [at %] | Resistance measurement (measuring protocol IFAM) [ohms] | Roughnesses $R_a/R_z$ [µm] |
|---|---|---|---|---|---|---|
| Ref | No | | <detection limit | 0.7 | 5.3 +− 1.9 | 0.48 ± 0.05/ 4.83 ± 0.62 |
| Ref + DELO Quick 5004 | | 1.33 +− 0.61 | | | | |
| Cu-50-10 | No | 1.5 +− 0.48 | 0.01 | 0.1 | 4.6 +− 1.5 | |
| Cu-125-10 | Yes | 1.57 +− 0.22 | 0.04 | 0.1 | 4.7 +− 1.5 | 0.46 ± 0.01/ 4.75 ± 0.40 |
| Cu-125-100 | Yes | (1.97) | 0.17 | 0.2 | 5.1 +− 1.0 | 0.48 ± 0.05/ 4.83 ± 0.62 |
| Cu-500-10 | Yes | 2.0 +− 0.1 | 0.03 | 0.3 | 4.4 +− 1.6 | 0.48 ± 0.05/ 5.28 ± 0.60 |
| M-400-10 | No | 1.82 +− 0.19 | 0.01 | 0.2 | 4.4 +− 1.9 | 0.48 ± 0.06/ 5.04 ± 0.41 |
| M-400-100 | Yes | (2.0) | 0.15 | 0.2 | 1.0 +− 0.5 | 0.49 ± 0.05/ 5.62 ± 0.66 |
| Polished sheet metal | | | | | 0.054 +− 0.01 | 0.59 ± 0.07/ 5.47 ± 0.40 |

Sample Matrix Table

| Brush | No brushing operation | Brushing operation 10 times | Brushing operation 100 times |
|---|---|---|---|
| No brush | Ref | | |
| Cu 99.9% soft-annealed Diameter 50 µm Bristle length 12.5 mm Normal force with 3 mm pressing: 60 +− 5 mN | | Cu-50-10 | |
| Cu 99.9% soft-annealed Diameter 125 µm Bristle length 12.5 mm Normal force with 3 mm pressing: 740 +− 20 mN | | Cu-125-10 | Cu-125-100 |
| Cu 99.9% Tensile strength: 260 +− 15 MPa (soft-annealed) Diameter 500 µm Bristle length 30 mm Normal force with 3 mm pressing: 3920 +− 82 mN | | Cu-500-10 | |
| Brass CuZn36 Tensile strength: 814 +− 47 MPa (spring-hard) Diameter 400 µm Bristle length 30 mm Normal force with 3 mm pressing: 2551 +− 74 mN | | M-400-10 | M-400-100 |

A further electrical sheet in each case is coated, using a doctor blade, with the anaerobically curing adhesive DELO ML 5327, with a nominal layer thickness of 4 µm.

The brushed sides of the samples, and the activator-coated reference sample, are contacted with the adhesive-coated side of the second sheet and the assembly is fixed with a clamp (anaerobic conditions). The pressing pressure is 100 kPa. After 5 minutes at room temperature, testing takes place First it may be noted that for all of the samples according to the invention, in contrast to the reference, there was curing of the adhesive. However, in the case of the variants which ultimately possessed a copper concentration on the surface of 0.01 atom %, the process of adhesive curing was relatively slow. Accordingly it is preferred, in the method of the invention, for the resulting copper concentration at the surface, measured by XPS, to be 0.015 atom %, preferably 0.02 atom %, based on the atoms measured by XPS.

From the Fe concentration at the surface it is evident that even in the case of the M-400-100 sample, the insulating layer was not rubbed off, otherwise the iron concentration would be much higher. It emerged, however, that the resistance values are markedly poorer.

Without being tied to a theory, this can be explained by excessive abrasion of the insulating layer, with the necessary assumption that the insulating layer was not completely removed. Nevertheless it was found that the rubbing process can be controlled in such a way that the electrical sheet retains resistance values which are suitable even for relatively high-grade requirements. In the sense of the present invention, therefore, it is preferred for the rubbing process to be carried out in such a way that after the rubbing the electrical sheet with insulating layer retains a resistance of ≤2.0 ohms, preferably ≤2.5 ohms, more preferably ≤3 ohms, very preferably ≤4 ohms.

The invention claimed is:

1. A method for producing an electrical sheet pack comprising the steps of:
   a) providing an electrical sheet strip as a starting material for a plurality of sheet laminations for the electrical sheet pack,
   b) coating the electrical sheet strip with an insulation layer on one or both side of the electrical sheet strip,
   c) coating an area or part of the area of a first side of the electrical sheet strip with an anaerobically curing adhesive which cures under anaerobic conditions, the curing being catalyzed by a presence of a metallic catalyst and the anaerobically curing adhesive not including a cyanoacrylate adhesive, d) rubbing with a rubbing device an area of a second side of the electrical sheet strip, the second side not having the anaerobically curing adhesive coating disposed thereon, the rubbing device comprising a surface structure containing the metallic catalyst, the metallic catalyst including a metal selected from the group consisting of a beryllium metal, a transition metal, a compound of at least one of the aforementioned, and an alloy containing at least one of the aforementioned,
e) separating each of the plurality of individual sheet laminations for the electrical sheet pack from the electrical sheet strip,
f) contacting the plurality of sheet laminations for the electrical sheet pack in each case by contacting one side of one of the plurality of sheet laminations with one side of the next one of the plurality of sheet laminations, and
g) curing the anaerobically curing adhesive.

2. The method as claimed in claim 1, wherein step g) takes place at least partially and/or step f) takes place in the brake of the punching device.

3. The method as claimed in claim 1,
wherein the surface structures comprises a first plurality of bristles containing the metallic catalyst, and a second plurality of bristles not containing the metallic catalyst.

4. The method as claimed in claim 1, wherein the surface structures comprises or consists of a material selected from the group consisting of elemental copper, brass, bronze, iron, steel, manganese, beryllium.

5. The method as claimed in claim 1,
wherein the surface structure contains the metallic catalyst including the transition metal and has a diameter in a range of 0.005 mm-1 mm.

6. The method as claimed in claim 1, wherein the rubbing device is a brush selected from the group consisting of a disk brush, a plate brush, a strip brush, a sword brush, a cup brush, a cone brush, a roller brush, a round brush and a spiral brush.

7. The method as claimed in claim 1, wherein the anaerobically curing adhesive in step c) is applied over the area or part of the area using a spraying or printing process.

8. The method as claimed in claim 1, wherein the anaerobically curing adhesive in step c) is applied over the area or part of the area of the first side of the electrical sheet strip in a layer having a thickness in a range of 0.3 µm-50 µm.

9. The method as claimed in claim 1, wherein the area or part of the area of the first side of the electrical sheet strip being coated with the anaerobically curing adhesive is limited by a mask.

10. The method as claimed in claim 1, wherein a first and a last sheet lamination of the plurality of sheet laminations of the electrical sheet pack are not subjected to step c) on a side facing directly outwardly and away from the electrical sheet pack.

11. The method as claimed in claim 1, wherein before step c), the area or part of the area of the first side of the electrical sheet strip being coated with the anaerobically curing adhesive undergoes an adhesion-improving pretreatment step.

12. The method as claimed in claim 1, wherein the step g) of curing the anaerobically curing adhesive is assisted by a supply of energy.

13. The method as claimed in claim 1, wherein after step d), the area of the second side of the electrical sheet strip having been rubbed has a concentration of the metallic catalyst including the transition metal in a range of 0.015 atom % to 2 atom % as measured by means of ESCA and based on the total number of atoms detected by ESCA.

14. An electrical sheet pack produced or producible by a method as claimed in claim 1,
wherein a plurality of particles containing the metallic catalyst are disposed between the insulating layer and the anaerobically curing adhesive or in the anaerobically curing adhesive, the anaerobically curing adhesive not including a cyanoacrylate adhesive.

15. A device for creating the electrical sheet pack as claimed in claim 14, comprising a rubbing device, a device for applying the anaerobically curing adhesive, and a reservoir containing the anaerobically curing adhesive.

16. The method as claimed in claim 4, wherein the material contains bronze selected from the group consisting of phosphor bronze and gunmetal.

17. The method as claimed in claim 1,
wherein the surface structure containing the metallic catalyst has a Vickers hardness of 25-200.

18. The method as claimed in claim 1,
wherein the surface structure containing the metallic catalyst possesses a nominal tensile strength of 10 MPa-600 MPa.

19. The method as claimed in claim 1,
wherein the anaerobically curing adhesive in step c) is applied in a layer thickness having a thickness in a range of 0.5 µm-20 µm.

20. The method as claimed in claim 1,
wherein the area of the second side of the electrical sheet strip being rubbed with the rubbing device is limited by a mask.

21. The method of claim 11, wherein the adhesion-improving pretreatment step includes atmospheric pressure plasma pretreatment.

22. The method of claim 12,
wherein the step of g) curing the anaerobically curing adhesive is assisted by a supply of energy in a brake or in a non-brake region of a punching device.

23. The method of claim 13,
wherein the metallic catalyst contains copper.

* * * * *